Oct. 27, 1959   M. MEDER   2,910,160
CENTRIFUGAL FORCE COUPLING
Filed Nov. 9, 1956
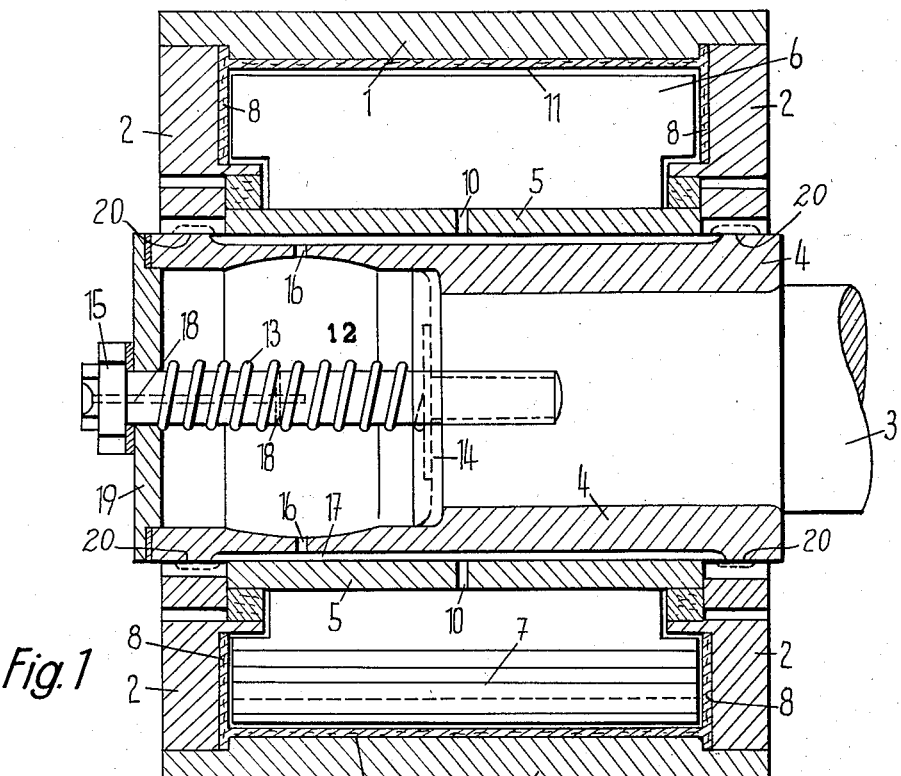
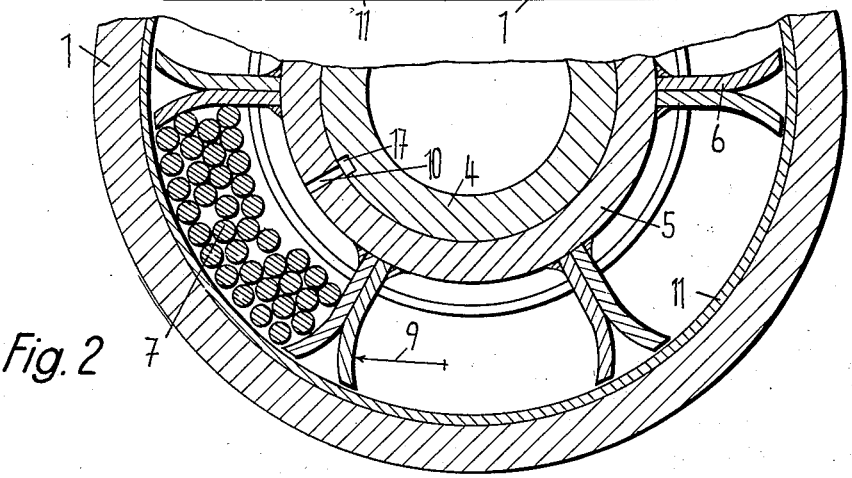
Fig. 1
Fig. 2
INVENTOR:
Max Meder
By *Gustav H. Emery*
Atty.

2,910,160

CENTRIFUGAL FORCE COUPLING

Max Meder, Hanau (Main), Germany

Application November 9, 1956, Serial No. 621,438

Claims priority, application Germany November 12, 1955

7 Claims. (Cl. 192—105)

This invention relates to a centrifugal coupling in which it is an object to provide a hollow cylindrical driven outer part with a driving bladed inner part and elongated members between the two which are influenced by centrifugal force to complete the coupling. It is a further object of the invention to prevent internal wear between the driving and driven members by providing a plurality of elongated rods which by centrifugal force provide the driving connection between the two relatively movable and rotatable members.

Another object of the invention resides in the provision of covering inserts which are easily replaceable when worn and which are not only provided in the direction of the centrifugal force but also at the end walls of the coupling of a plurality of chambers in each of which a plurality of round rods are provided.

Further objects will be apparent from the following description when considered in connection with the accompanying drawing in which:

Figure 1 is a longitudinal sectional view of the centrifugal coupling, and

Fig. 2 is a part cross section of the coupling of Fig. 1.

The driven coupling part consists essentially of a hollow cylindrical outer part 1 and the side walls 2. The rotary motion can, for example, be applied to a driven belt, not shown, which runs around the part 1, or a driven connection may be made with the side walls 2. The coupling is driven by means of a shaft 3 on which a sleeve or hub 4 is secured and on the latter a blade wheel 5 with blades or shovels 6 is secured. Each space between the blades 6 and the outer part 1 is filled with round steel rods 7 or the like.

The side walls 2 may be provided with inserts 8 provided against such walls 2 where the ends of the rods 7 contact, and such inserts are made of a wear-resisting material. Thus it is possible by quick exchange of the inserts 8 to replace worn inserts and thus restore the operation of the coupling.

Upon the rapid rotation of the internal parts, the rods 7 will be carried along by the blades 6 and by means of the centrifugal force set up, the rods 7 will be urged with great force against the inner wall of the outer part 1 to thus impart a rotary movement on the driven part. The further inner-positioned round steel rods will increase the force against the rods adjacent the outer part 1 to thus impart a force on the blades 6 which will be considerably greater than the centrifugal force imparted by the rods 7 on the outer part 1.

The inner wall of the outer part 1 may be provided with a cover 11 of a material resisting wear so that it is thus possible to construct the outer part 1 of an inexpensive material. It is of course possible to easily replace the cover 11 without the necessity of entirely replacing the outer part 1 upon wear of the inner parts of the coupling.

In order to reduce wear as much as possible, the internal spaces between the blades 6 may receive a lubricant through openings 10, which latter may be connected to a lubricating device, located in the space 12 of the central part of the coupling. The hollow space or chamber 12 is made tight relative to the shaft 3 by means of a washer or plate 14 with a gasket under the force of a spring 13 and closed on the outer surface by a cover 19. A bolt 15 keeps the cover 19 tightly closed and the spring 13 is provided around the bolt as shown in Fig. 1. The lubricant will, by centrifugal force, flow from the chamber 12 through the openings 16 in the hub 4 into the space 17, into the two bearings (right and left), and then through the openings 10 into the blade spaces to lubricate the rods 7 as well as two bearings 20. To replenish the lubricant the bolt 15 is provided with a central passage or channel 18.

As shown in Fig. 2 the blades 6 are mounted as double blades each with a curved outer end having a radius 9. The blades 6 are suitably secured on the sleeve 5 by means of welds.

The operation of the coupling is believed to be obvious from the foregoing description since it will be evident that the drive connection between the shaft 3 and the outer part or cylinder 1 is accomplished by means of the bladed wheel carrying with it the rods 7 which latter by centrifugal force, will be pressed against the inner wall of the cylinder 1.

I claim as my invention:

1. A centrifugal coupling comprising a shaft, an inner bladed wheel mounted to rotate with the shaft and forming a plurality of chamber spaces, an outer cylindrical member provided around the bladed wheel and closing the spaces, and a plurality of rods provided in each chamber space whereby when the driving shaft and bladed wheel is rotated the centrifugal force on the rotating rods will press against the cylindrical member to drive the latter, each blade of the wheel being provided with a double curved end portion flared in opposite directions with their peripheral ends adjacent the outer cylindrical member.

2. A centrifugal coupling comprising a shaft, an inner bladed wheel mounted to rotate with the shaft and forming a plurality of chamber spaces, an outer cylindrical member provided around the bladed wheel and closing the spaces, and a plurality of rods provided in each chamber space whereby when the driving shaft and bladed wheel is rotated the centrifugal force on the rotating rods will press against the cylindrical member to drive the latter, each blade of the bladed wheel being formed of double sheet metal with outwardly flared ends in opposite directions to a slight distance from the internal periphery of the outer cylindrical member.

3. A centrifugal coupling according to claim 2, in which the length of the rods is almost equal to the width of each chamber space.

4. A centrifugal coupling according to claim 2, in which a hub is provided mounted on the shaft with the bladed wheel mounted on the hub to rotate therewith.

5. A centrifugal coupling according to claim 2, in which bearings are provided for the outer cylindrical member and in which a hub is provided mounted on the shaft with the bladed wheel mounted on the hub to rotate therewith, and in which a lubricating means is provided mounted in the hub to supply lubricant to the rods and bearings in the chamber spaces.

6. A centrifugal coupling comprising a shaft, a sleeve mounted on the shaft and secured on the shaft, an inner bladed wheel mounted on the sleeve to rotate with the shaft and forming a plurality of chamber spaces by means of the blades, an outer cylindrical member provided around the bladed wheel and closing the spaces, and a plurality of rods provided in each chamber space whereby when the driving shaft and bladed wheel is rotated the centrifugal force on the rotating rods will press against the cylindrical member to drive the latter, each blade of the wheel being secured to the sleeve and being provided with a double curved end portion flared in opposite directions with their peripheral ends adjacent the outer cylindrical member, said flared end portions preventing wedging of the rods with the cylindrical member.

7. A centrifugal coupling comprising a shaft, a sleeve mounted on the shaft and secured on the shaft, an inner bladed wheel mounted on the sleeve to rotate with the shaft and forming a plurality of chamber spaces by means of the blades, an outer cylindrical member provided around the bladed wheel and closing the spaces, and a plurality of rods provided in each chamber space whereby when the driving shaft and bladed wheel is rotated the centrifugal force on the rotating rods will press against the cylindrical member to drive the latter, each blade of the bladed wheel being secured to the sleeve and being formed of double adjacent metal sheets with outwardly flared ends in opposite directions to a slight distance from the internal periphery of the outer cylindrical member, said flared end portions preventing wedging of the rods with the cylindrical member.

References Cited in the file of this patent
UNITED STATES PATENTS

| | | |
|---|---|---|
| 1,848,616 | Fottinger | Mar. 8, 1932 |
| 1,859,963 | Futscher | May 24, 1932 |
| 1,956,934 | Stelzer | May 1, 1934 |
| 2,626,033 | Lewis et al. | Jan. 20, 1953 |

FOREIGN PATENTS

| | | |
|---|---|---|
| 307,872 | Great Britain | Apr. 18, 1929 |
| 259,551 | Switzerland | July 1, 1949 |